Patented May 7, 1935

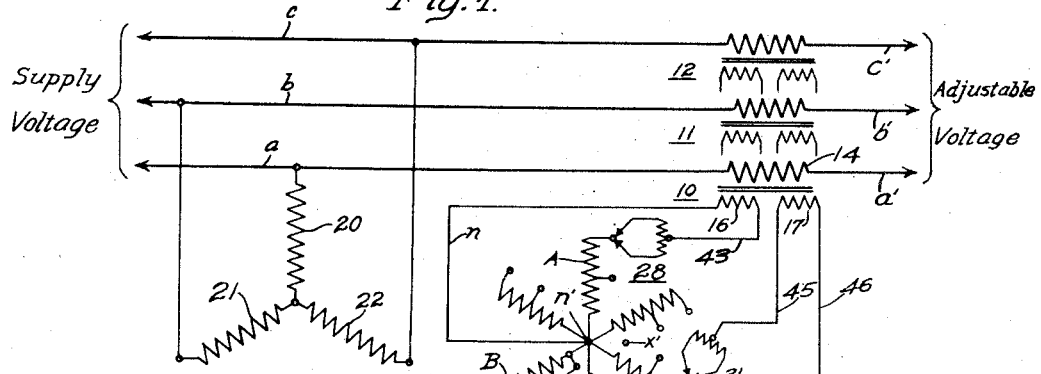

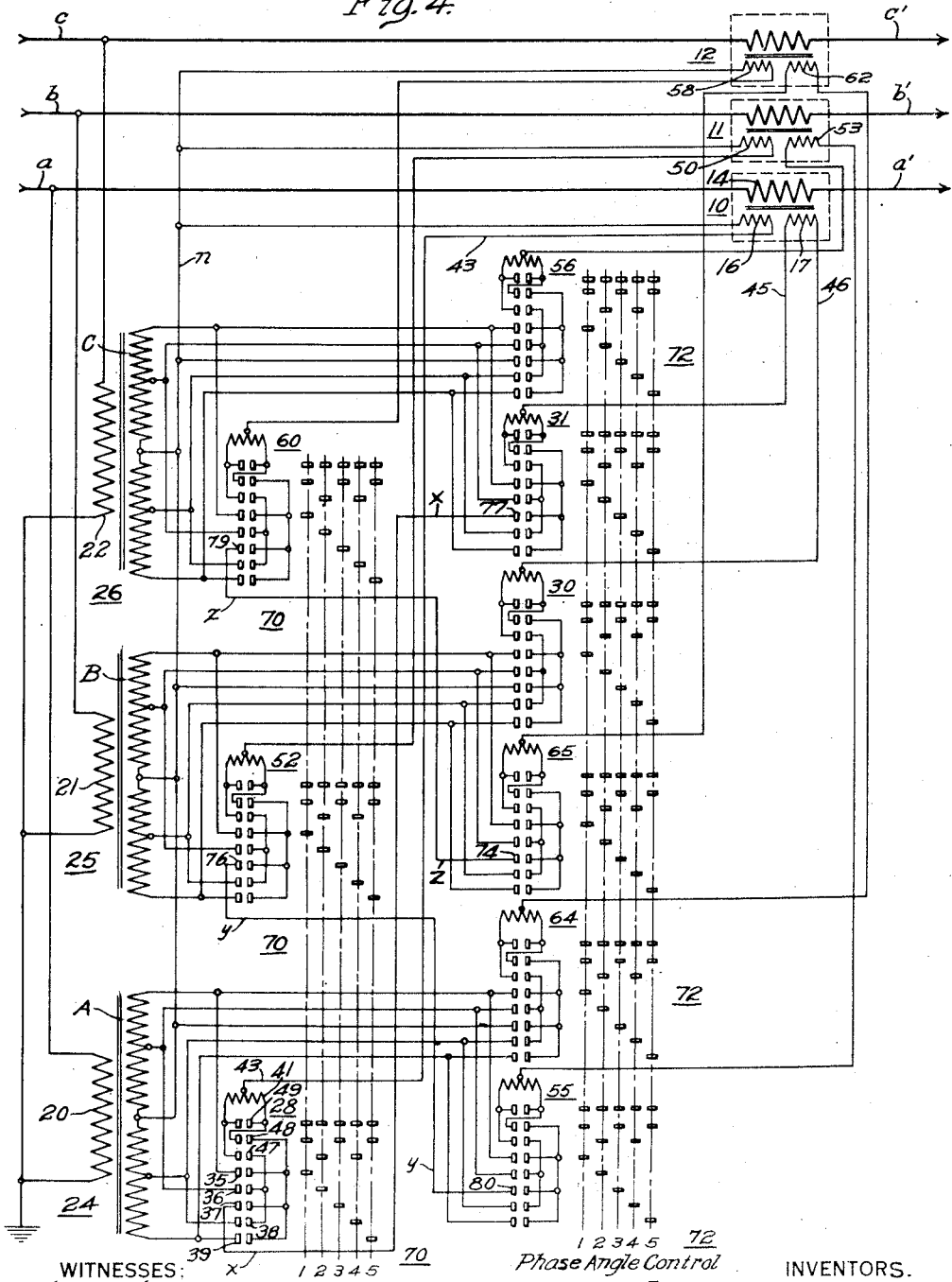

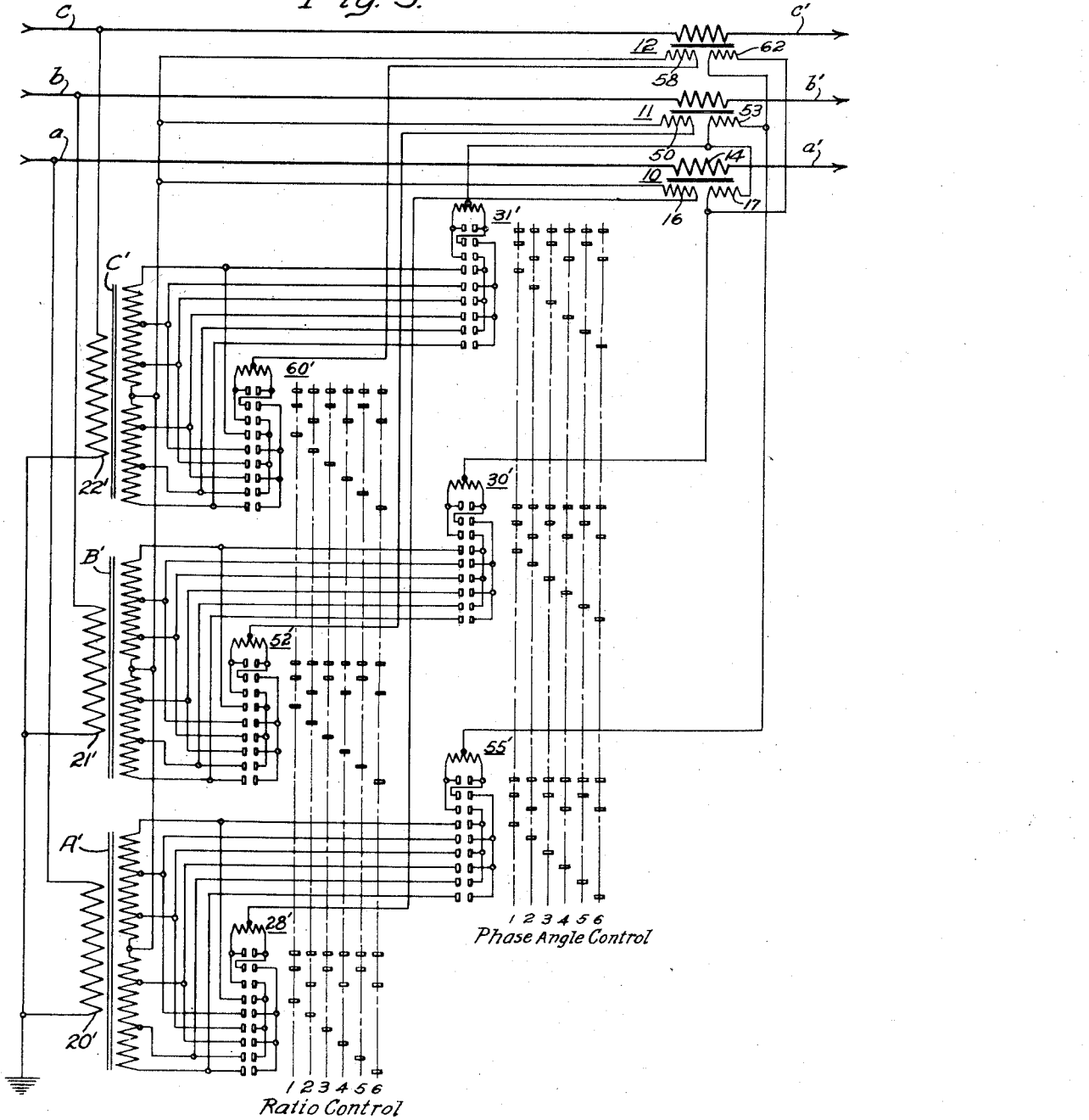

2,000,776

UNITED STATES PATENT OFFICE 2,000,776

REGULATING SYSTEM

James T. Mercereau, Sharon, and Albert J. Maslin, Sharpsville, Pa., assignors to Westinghouse Electric & Manufacturing Company, East Pittsburgh, Pa., a corporation of Pennsylvania Application October 19, 1932, Serial No. 638,584

6 Claims. (Cl. 172—238)

Our invention relates to regulating systems and it has particular relation to transformer systems for adjusting, without removing the load therefrom, both the magnitude and phase angle position of the voltages acting in interconnected alternating-current power circuits.

It frequently occurs, when it is desired to interconnect two power lines, that there is a phase angle difference between the voltages of the two systems as well as a difference in the voltage magnitudes at the desired point of connection, and in a situation of this kind it is necessary to provide means for bringing the phase position and the magnitude of the two voltages together in order that one system may be properly matched with the other.

Likewise, there are many instances in which it is desired to control power flow between two such interconnected lines. As is well known in the art, the difference in the phase angle position of the respective line voltages determines and controls the actual power transfer while the difference in the magnitudes of the same two respective voltages similarly regulates the flow of wattless power between the two lines.

The use of "booster" or series transformers in the line conductors of power circuits to introduce therein components of regulating voltage is recognized as being a highly satisfactory manner of controlling electrical systems of the type under consideration. It has been proposed to provide for this purpose one set of such transformers for adding "in-phase" components of regulating voltage and a separate set of like transformers for adding "out-of-phase" components. Later it was found possible to obtain equivalent results by utilizing only one series transformer per line, the primary winding of which was arranged to be energized jointly by two independenly adjustable sources of voltage, one of which was substantially in phase with that of the power circuit voltage and the other of which bore a substantial out-of-phase relation thereto.

For three-phase power-circuit applications, which are by far the most common ones at the present time, the type of system last named requires, in the group of main regulating transformers which supply the two components of adjusting voltage, one set of windings for the ratio or in-phase components and a duplicate set of windings for the phase-angle or out-of-phase regulating components. Such duplication adds to the expense of the complete system. Likewise, the requirement in the first named scheme of two separate series transformers per line is open to a similar objection.

We have discovered that by combining and inter-connecting the elements of our regulating system in a novel manner, all of the regulating functions which are obtainable by the systems just described, may be performed by the use of one three-winding series transformer per circuit conductor, the two primary windings of which may be energized from but a single set of component supply windings in the main regulating transformer group. As an analysis of the elements of a system of the type under consideration will reveal the kva. capacity required of each of the series transformer windings is but one-half of that required of each of the component-supply windings in the group of main regulating transformers. Hence, by the substitution of an extra or third winding on each of the series transformers in place of a second component-supply winding on each of the main regulating transformers, a substantial reduction in the cost of the complete system may be effected.

In order that a scheme of the type contemplated by us may be practically operative, it is necessary either that the regulating voltages impressed upon the two primary windings of the series transformers never be simultaneously adjusted to zero magnitude, or if such zero adjustment is made that at least one of these primary windings be short-circuited. It will be understood that such requirements result from the fact that the power current of the regulated circuit in passing through the secondary windings of the series transformers magnetizes the core elements thereof so that in the event that both of the primary windings are simultaneously open circuited the core material will become highly saturated and the winding insulation stressed by virtue of high over-voltages set up in the winding turns.

Heretofore, no suitable method for connecting the tap changing equipments, associated with the main regulating transformer windings to control the ratio and phase shifting components of series transformer energizing voltage, has been known which prevents a simultaneous zero magnitude adjustment of the two components or which is capable of automatically effecting the short-circuiting requirement only upon such simultaneous zero magnitude adjustment. Our invention provides these required connections and thus permits the inherently less expensive regulating combination already described to be practically operative.

It is, accordingly, an object of our invention to reduce the cost of the equipment used in combined voltage magnitude and phase angle regulating systems by providing improved methods of connecting and combining the elements employed.

It is another object of our invention to reduce the weight of and space required by regulating equipments of this type.

A further object of our invention is to provide in a system comprising a three-winding series transformer associated with each of the circuit conductors means for short-circuiting one of the primary windings of each of the series transformers when both of its energizing voltages are simultaneously adjusted to zero magnitude.

A still further object of our invention is to so dispose the tap-changing equipments in a system of the type described that a zero magnitude adjustment of either regulating voltage component cannot be effected.

In practicing one embodiment of our invention, we provide in association with the tap-changing equipments through which each of the three winding series transformers is energized from the component-supply transformer windings, an isolated contact point to which both the ratio and phase angle adjusting taps are connected when the two respective components of regulating voltage are adjusted to zero magnitude. Such a connection serves to complete the short-circuiting of the series transformer primary windings required for this condition, which short-circuiting is maintained only as long as both regulating components are maintained at the zero magnitude adjustment, it being interrupted when either of the adjusting tap connections is shifted from the isolated contact point. In a second embodiment of our invention we so connect the tap-changing equipments with the component-supply transformer windings that in no position combination of the equipments can both regulating components be adjusted to zero magnitude.

Our invention itself will best be understood through the following description of specific embodiments thereof when taken in conjunction with the accompanying drawings, in which Figure 1 is a diagrammatic view of apparatus and circuits arranged in accordance with one embodiment of our invention utilizing an isolated-contact point short-circuiting scheme which is illustrated as being applied to a three-phase power circuit, the diagram showing the ratio and phase-angle regulating equipments for one phase only.

Fig. 2 is a similar diagrammatic view of apparatus and circuits arranged in accordance with a second embodiment of our invention in which the neutral connection of the component-supply windings is spaced intermediate the tap-changer equipment connections made to these windings.

Fig. 3 is a diagrammatic view of the system illustrated in Fig. 1 shown as combined with three-phase power circuits which are interconnected through the medium of a bank of auto-transformers.

Fig. 4 is a diagrammatic view of the system of Fig. 1 in which the connections of the tap changing underload mechanisms associated with the windings of the main regulating transformers are illustrated, and Fig. 5 is a similar diagrammatic view of the system of Fig. 2 in which the connections of the tap-changing underload mechanisms associated with the windings of the main regulating transformers are illustrated.

Referring to the drawings and particularly to Fig. 1 thereof, a three-phase power circuit, represented by line conductors $a$, $b$ and $c$, is shown as being connected by means of series or booster transformers 10, 11 and 12 with the corresponding conductors $a'$, $b'$, and $c'$ of a second circuit. The transformers, which are for the purpose of introducing ratio and phase angle adjusting voltages into the power circuit for regulating purposes, are illustrated as being of the well known three winding type, transformer 10, for example, comprising a secondary winding 14 and two primary or supply windings 16 and 17.

To supply these adjusting voltages we provide regulating transformers comprising windings A, B and C which may be suitably energized either directly from the power circuit conductors $a$, $b$ and $c$ or inductively, as shown, through the medium of windings 20, 21 and 22 which are magnetically coupled with windings A, B and C, respectively. These several windings may take the form of three transformers, such as are illustrated at 24, 25 and 26 in the diagram of Fig. 4, in which the system of Fig. 1 is shown in greater detail. It will be noted that the transformer windings are "star" connected.

As can be seen most readily from Fig. 1, in which the windings of the three component-supply or regulating transformers are shown in accordance with the vector relations of the voltages acting in them, primary winding 16 of series transformer 10 is energized from regulating transformer winding A, through the medium of tap-changing apparatus 28, which supplies a voltage of adjustable magnitude which is substantially in phase with the power voltage acting on line conductor $a$. Similarly, the second primary winding 17 of transformer 10 is energized, through the medium of tap-changing equipments 30 and 31, by portions of windings B and C comprised by the remaining two phases which are so combined that they supply a voltage substantially in quadrature with the power voltage acting on line conductor $a$. Thus, it will be seen that adjustment in the ratio of the voltages between circuits $a$—$b$—$c$ and $a'$—$b'$—$c'$ is effected by changing the energization of primary winding 16, while adjustments in the phase displacement of these voltages is similarly effected by changing the energization of primary winding 17 of transformer 10. Inasmuch as the connections for energizing transformers 11 and 12 associated with conductors $b$ and $c$ are similar to those which are illustrated for transformer 10 associated with conductor $a$, no showing of them has been made in Fig. 1.

In Fig. 1 the tap-changing equipment 28 is illustrated as occupying an extreme position in which the magnitude of the ratio-adjusting voltage supplied to transformer 10 is maximum in one direction. Movement of the equipment downwardly past the neutral connection $n$ to the lower end of winding A causes this ratio-adjusting voltage to be progressively decreased to zero, reversed and increased to a similar maximum value in the opposite direction. Likewise, in Fig. 1 equipments 30 and 31 are shown in the maximum phase-shifting position in one direction, the magnitude of the quadrature voltage supplied to transformer 10 being of the highest value obtainable. Simultaneous movement of the two equipments towards the center or neutral point connection $n'$ of windings B and C causes the phase shifting voltage to be reduced and further movement beyond the neutral point effects a phase reversal of this voltage.

As has been pointed out, when a series transformer is connected in a current-carrying line, it is necessary, in order to prevent magnetic saturation of the transformer core due to the line current and to keep the voltage thus induced in the supply winding from rising to an excessively high value, to either energize the supply winding of the transformer or shunt it through an auxiliary circuit. In a situation of the type under consideration, therefore, in which each of the series transformers is provided with two primary windings, it is essential to the practical operation of the system that at all times at least one of the primary windings be either energized or otherwise shunted through an external circuit. Consequently, for the condition in which both the ratio and phase-shifting components of regulating voltage are adjusted to zero magnitude, winding-shunting means must be brought into effect.

In accordance with the modification of our invention shown in Fig. 1, this short-circuiting requirement is met through the provision of an isolated contact point in association with the tap changing equipments through which each of the series transformers are supplied, which contact point becomes common to the otherwise separated energizing circuits for the ratio and phase angle windings of the series transformer when the two regulating voltages are adjusted to zero magnitude. In Fig. 1 this contact point is represented at $x'$ and except for the zero magnitude condition of the regulating components named, it is completely isolated from the regulating circuits.

As tap-changing equipment 20 is moved downwardly along winding A toward neutral point $n'$ thereof, instead of directly connecting with this neutral point the equipment connects with isolated contact point $x'$. This interrupts the energizing of circuit ratio winding 16 of transformer 10. As tap changing equipments 30 and 31 are simultaneously moved along the lengths of windings B and C toward the neutral connecting point $n'$, equipment 30 connects with contact point $n''$ which is electrically joined with the neutral connection while equipment 31 connects with isolated point $x'$. For this particular condition in which both the in-phase voltage, which energizes winding 16, and the quadrature voltage, which energizes winding 17 of transformer 10, are of zero magnitude, there has been completed a shunting circuit for the primary windings of the transformer which extends from neutral point $n'$ through conductor $n$, winding 16, conductor 43, tap-changing equipment 28, isolated contact point $x'$, tap-changing equipment 31, conductor 45, winding 17, conductor 46, tap-changing equipment 30 and contact point $n''$ back to neutral connection $n'$. This shunting circuit, which includes both of the primary windings of series transformer 10 fulfills the requirement before stated.

In addition to the requirement just discussed, it is further essential that when either the ratio or the phase angle primary winding of the series transformer is energized, neither of these two windings should be short-circuited, otherwise the corrective influence cannot be communicated to the secondary winding of the transformer because of the well-known damping effect which such a closed magnetically linked circuit imposes. The system of our invention will be seen to properly provide for this requirement, inasmuch as when either tap changing equipment 28 or 31 is moved from isolated contact point $x'$, the shunting circuit is interrupted for both of the primary windings and the corrective regulating voltages are thus allowed to be transmitted freely through the series transformers.

It will be apparent that the system of our invention is likewise applicable to situations in which the supply and output circuits are not directly connected, as in the showing of Fig. 1, but are coupled together through the medium of power transformers. Such a combination is illustrated in Fig. 3 in which the supply circuit comprising conductors $a$, $b$ and $c$ is coupled with a second circuit comprising conductors $a'$, $b'$ and $c'$ through the medium of star connected auto-transformer windings $A''$, $B''$ and $C''$. In this situation the corrective or regulating voltages may be supplied to series transformers 10, 11 and 12 from the star connection of the power transformer windings $A''$, $B''$ and $C''$ in a manner which is exactly comparable to that shown in Fig. 1 in which the regulating supply windings A, B and C are energized inductively rather than through direct electrical connection with the main power conduit conductors. The operation of the system of Fig. 3 is, as will be evident, exactly comparable to that of Fig. 1.

One preferred form of actual equipment which may be utilized in practicing the modification of our invention illustrated in Fig. 1 is shown in Fig. 4. In Fig. 4, which, as has been mentioned, is a complete illustration of the system shown in part in Fig. 1, the tap changing equipments 28, 30 and 31 diagrammatically represented in Fig. 1 as being associated with the energizing circuits for series transformer 10 have been shown in greater detail, and the energizing circuits for series transformers 11 and 12 are likewise included in the diagram. Thus, in the case of transformer 11, ratio primary winding 50 thereof will be seen to be energized from main transformer winding B through tap-changing equipment 52, while phase-angle primary winding 53 of the transformer 11 is energized from main transformer windings A and C through tap-changing equipments 55 and 56. Similarly, ratio-primary winding 58 of series transformer 12 is energized from main transformer winding C through tap-changing equipment 60 while phase-angle primary winding 62 of transformer 12 derives its energization from main transformer windings A and B through tap-changing equipments 64 and 65.

Each of the tap-changing equipments designated may be of any suitable type designed for operation without removal of load. As illustrated in Fig. 4, each equipment is of the type shown and described in a copending application Serial No. 613,427 of F. L. Snyder, filed May 25, 1932 and assigned to the Westinghouse Electric and Manufacturing Company. Thus, for example, equipment 28, which will be seen to be representative of all of the others, is shown as comprising five tap-selector switches 35, 36, 37, 38 and 39, each of which is provided with the two cooperating contact members shown. A tap-bridging auto-transformer 41 is connected, through transfer switches 47 and 48, to the tap switches in the manner illustrated, its midpoint constituting the connection from the tap-selector switches to the external circuit comprising conductor 43. It will be observed that the tap-selector switches are joined with taps suitably brought out from winding A. A shunting switch 49 serves to short circuit the auto-transformer 41 when the equipment occupies the on-tap positions.

It will be noted from examining the switch controller development at the right of equipment 28 that five tap connections may be made from the operation of the switches. For example, in controller position No. 1, the conductor 43 is connected to the upper end of transformer winding A through tap-selector switch 35, transfer switch 48, and the tap-bridging winding 41. In controller position No. 2, conductor 43 is connected with the next lower tap of winding A through selector switch 36, transfer switch 47, and tap-bridging winding 41. A comparable sequence of switch operation continues throughout the range of control that is effective among the total number of transformer taps with which the equipment is associated.

Preferably, all of the ratio-control tap-changing equipments 28, 52 and 60 are arranged for parallel operation as is indicated by the switch controller development representations 70 associated with these equipments. Likewise, it is preferable to arrange all of the phase-angle control tap-changing equipments 55, 64, 65, 30, 31 and 56 for simultaneous operation in the manner indicated by the representation of the group of controller developments shown at 72 associated with these equipments.

A comparison of the simplified schematic representation of Fig. 1 with the more detailed diagrammatic showing of Fig. 4 indicates that in the case of the energizing circuits associated with series transformer 10, the isolated contact point designated by $x'$ in Fig. 1 comprises contact members 37 and 77 of tap-changing equipments 28 and 31, which members are interconnected by means of conductor $x$. The isolated contact point associated with the energizing circuits of series transformer 11 comprises contact members 76 and 80 of tap-changing equipments 52 and 55, respectively, which members are interconnected by means of conductor $y$, while the isolated contact point associated with the circuits of series transformer 12 similarly comprises contact members 79 and 74 of tap-changing equipments 60 and 65, respectively, interconnected by means of conductor $z$.

It will be seen that in the system of Fig. 4, the ratio correction is zero when the tap changers operated by controllers 70 are on position No. 3, while the phase angle correction is similarly zero when the tap changers operated by controllers 72 are on position No. 3. For the above conditions it will be seen that the two primary windings of each of the series transformers 10, 11 and 12 are shunted in series through circuits which include conductors $x$, $y$ and $z$, respectively, and further that when either the ratio or the phase angle primary windings of the transformers are energized by a regulating voltage of appreciable value, as when either group of tap changers is shifted in either direction from position No. 3, this shunting circuit for the primary windings of the series transformers is interrupted.

The first embodiment of our invention which utilizes an isolated contact point short-circuiting scheme for the feed windings of the booster transformers having been described, attention will now be directed to the second embodiment shown in Figs. 2 and 5. In this embodiment means are provided whereby neither of the feed winding energizing voltages can be completely reduced to zero and in this manner the necessity for externally shunting the feed windings is effectively eliminated.

It will, of course, be apparent that this expedient imposes a slight limitation in the precision of regulatory adjustment, however, in the majority of applications the requirements will be found to permit of this lack of absolute accuracy within the region of zero magnitude of regulating voltage components.

Referring to Fig. 2, the system there shown will be seen to be a duplicate of that illustrated in Fig. 1 with the exception that instead of providing an isolated contact point to effect a completion of an external shunting circuit for the booster transformer feed windings, when the two regulating components are simultaneously adjusted to zero magnitude, the tap connections made to the star-connected component supply windings A', B', C' are made in such a manner that the neutral point $n'$ is not directly connected with any of the taps but is spaced intermediate the adjacent taps connected nearest it.

Thus, for example, as ratio control tap changer 28' is moved downwardly along the length of winding A', it connects with tap 75 and then with tap 76 on the opposite side of neutral point $n'$, thereby preventing the energizing voltage for feed winding 16 of booster transformer 10 from being reduced to zero magnitude as would be the case were equipment 28' to connect directly with point $n'$. In a similar manner, tap changing equipments 30' and 31' associated with windings B' and C' are illustrated as likewise being disposed to omit a direct connection with neutral point $n'$ by virtue of the spacing on either side of this neutral point of the tap connections adjacent to it.

One preferred form of actual equipment which may be utilized in practicing the modification of our invention illustrated in Fig. 2 is shown in Fig. 5. In this figure, which, as has been mentioned, is a complete illustration of the system shown in part in Fig. 2, the tap changing equipments 28', 30' and 31', diagrammatically represented in Fig. 2 as being associated with the energizing circuits of series transformer 10, have been shown in greater detail, and the energizing circuits for series transformers 11 and 12 are likewise included in the diagram. Thus, in the case of transformer 11, ratio primary winding 50 thereof will be seen to be energized from main transformer winding B' through tap changing equipment 52' while phase angle primary windings 53 of the transformer is energized from main transformer windings A' and C' through tap-changing equipments 31' and 55'. Similarly, ratio primary winding 58 of series transformer 12 is energized from main transformer winding C' through tap changing equipment 60', while phase angle primary winding 62 of transformer 12 derives its energization from main transformer windings A' and B' through tap changing equipments 55' and 30'.

It will be noted that the elimination of the isolated - contact - point feed - winding-shunting scheme makes it possible to control the phase angle feed winding energization of the three booster transformers 10, 11 and 12 through the use of but three tap changing equipments (55', 30' and 31') instead of six (55, 64, 65, 30, 31 and 56) required by the comparable system shown in Fig. 4. In Fig. 5 it will also be observed that the three phase angle feed windings (17, 53 and 62) are delta connected in the manner shown instead of being isolated from one another as in the system of Fig. 4.

It will be understood that each of the tap-changing equipments designated may be of any suitable type designed for operation without the removal of load. As illustrated, in Fig. 5 each of these equipments is of the same type as that shown and described in connection with the system of Fig. 4, the only deviation from a complete identity of illustration being that in the system of Fig. 5 each of the component supply transformer windings A', B' and C' is provided with six taps instead of five as are the corresponding windings in the system of Fig. 4, which requires that each tap changing equipment be provided with six tap selector switches instead of five. Thus, the switch controller developments at the right of the two groups of tap changing equipments of Fig. 5 are of the six-position type. An examination thereof, however, will reveal that the operation is identical with that which has already been explained for the tap changing equipments of the system of Fig. 4.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In combination, two electrical power circuits, a series transformer, comprising two primary windings and a secondary winding, joining together conductively, through its secondary winding, each conductor of one power circuit with the corresponding conductor of the other power circuit, two sources of voltage for respectively energizing said two primary windings of each transformer, the voltage of the first source being substantially in phase with the power voltage acting on the given conductor and the voltage of the second source having a substantial out-of-phase relation thereto, means for independently adjusting the magnitude of each of said voltages, and means for preventing the primary windings of said transformers from being open circuited when the said two energizing voltages for each transformer are simultaneously adjusted within the regions of zero magnitude.

2. In combination with a polyphase electrical power circuit, a system for regulating the magnitude and phase position of the voltages between the input and output sides of said circuit comprising a booster transformer associated with each of the circuit conductors, each of said transformers having a secondary winding connected in circuit with the conductor and two primary windings, a source of voltage substantially in phase with the conductor power voltage disposed to energize one of said primary windings of each transformer and a second source of voltage having a substantial out-of-phase relation to said power voltage for energizing the other of said primary windings, means for independently adjusting the magnitude of each of said energizing voltages, and means for shunting one of said primary windings when both of said energizing voltages are adjusted to zero magnitude.

3. In combination, two electrical power circuits, a series transformer, comprising two primary windings and a secondary winding, joining together conductively, through its secondary winding, each conductor of one power circuit with the corresponding conductor of the other power circuit, two sources of voltage for respectively energizing said two primary windings of each transformer, the voltage of the first source being substantially in phase with the power voltage acting on the given conductor and the voltage of the second source having a substantial out-of-phase relation thereto, means for independently adjusting the magnitude of each of said voltages, and means for shunting one of said primary windings of each transformer when both of its energizing voltages are simultaneously adjusted to zero magnitude.

4. A combined ratio and phase-angle regulating system for a polyphase electrical power circuit comprising in combination, a booster transformer, having two feed windings, associated with each of the circuit conductors, a source of voltage substantially in phase with the power voltage acting upon each of said conductors disposed to energize one of said feed windings of the associated booster transformer, a second source of voltage having a substantial out-of-phase relation to the first disposed to energize the other of said feed windings of the booster transformer, means for independently adjusting the magnitude of each of said energizing voltages, and means for shunting one of said feeding windings of each of said booster transformers when both of its feed winding energizing voltages are simultaneously adjusted to zero magnitude.

5. In combination with a three-phase power circuit, a combined ratio and phase-angle regulating system comprising a two-feed-winding booster transformer connected with each of the circuit conductors, a group of supply transformers comprising three star-connected windings in which the voltages of the three phases of the power circuit are disposed to act, respectively, tap-changing means associated with the said supply windings, a "ratio" energizing circuit for one of the feed windings of each booster transformer comprising the supply-winding star-connection neutral point and a tap-changing means associated with the supply winding which corresponds to the phase of the conductor with which the booster transformer is connected, a "phase-angle" energizing circuit for the other feed winding of each booster transformer comprising a tap changing means associated with each of the two non-associated phase supply windings, and means for short circuiting the feed windings of each booster transformer when both of its energizing voltages are simultaneously adjusted to zero magnitude.

6. In combination with a three-phase power circuit, a combined ratio and phase-angle regulating system comprising a two-feed-winding booster transformer connected with each of the circuit conductors, a group of supply transformers comprising three star-connected windings in which the voltages of the three phases of the power circuit are disposed to act, respectively, tap-changing means associated with the said supply windings, a "ratio" energizing circuit for one of the feed windings of each booster transformer comprising the supply-winding star-connection neutral point and a tap-changing means associated with the supply winding which corresponds to the phase of the conductor with which the booster transformer is connected, a "phase-angle" energizing circuit for the other feed winding of each booster transformer comprising a tap-changing means associated with each of the two non-associated phase supply windings, and means for short circuiting the feed windings of each booster transformer when both of its energizing voltages are simultaneously adjusted to zero magnitude, said means comprising an isolated contact point disposed to be engaged by the tap-changing means in the said ratio circuit instead of the supply-winding neutral point and also by one of the tap-changing means in the said phase-angle circuit instead of the supply-winding neutral point.

JAMES T. MERCEREAU.
ALBERT J. MASLIN.